United States Patent [19]

Glassow et al.

[11] 4,226,484
[45] Oct. 7, 1980

[54] BEARING RETAINER

[75] Inventors: Franklyn A. Glassow, Redondo Beach; Arthur C. Cunningham, Mission Viejo, both of Calif.

[73] Assignee: Hughes Aircraft Company, Culver City, Calif.

[21] Appl. No.: 972,120

[22] Filed: Dec. 20, 1978

[51] Int. Cl.$^3$ .............................................. F16C 33/38
[52] U.S. Cl. ............................. 308/201; 308/DIG. 8
[58] Field of Search ............... 308/199, 200, 201, 216, 308/217, 240, 243, DIG. 8, DIG. 11

[56] References Cited

U.S. PATENT DOCUMENTS

| | | | |
|---|---|---|---|
| 3,510,185 | 5/1970 | McKee | 308/201 X |
| 3,529,875 | 9/1970 | McKee | 308/201 |
| 3,627,607 | 12/1971 | Benzinger | 156/192 |
| 4,073,552 | 2/1978 | Christy | 308/201 |

*Primary Examiner*—Frederick R. Schmidt
*Attorney, Agent, or Firm*—Kenneth W. Float; W. H. MacAllister

[57] ABSTRACT

A ball bearing having a metal inner and outer ring, each ring having at least one land, and the bearing having metal balls disposed between the rings to form load bearing metal-to-metal interfaces. A ball bearing retainer disposed between the rings of the bearing, the retainer comprising rigid members supporting a soft, flexible, highly porous annular body having ball pockets for receiving the bearing balls, and having at least one projection on at least one circumferential surface thereof. The ball pockets are sized to have an interference fit with the balls, and the projection is made to be in contact with at least one land of the inner or outer ring. The annular body is made of a porous foamlike material capable of absorbing up to eighty percent by volume of a liquid lubricant, such as oil, and being capable of supplying a suitably large fraction of the stored lubricant to the bearing.

6 Claims, 9 Drawing Figures

U.S. Patent  Oct. 7, 1980  4,226,484
Fig. 2. (PRIOR ART)
Fig. 1.
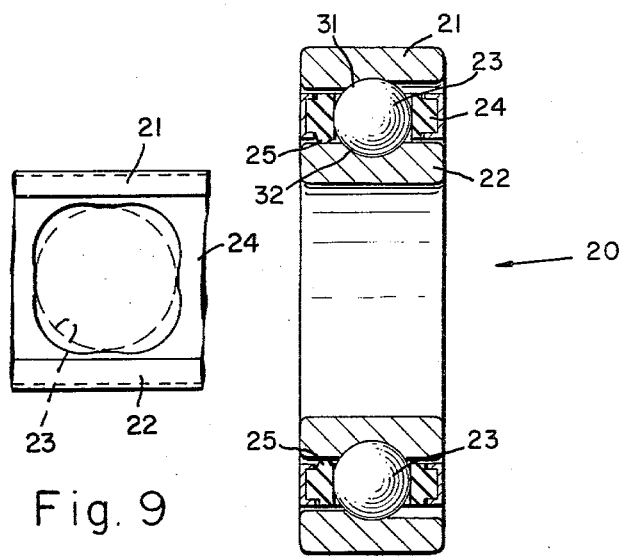
Fig. 9
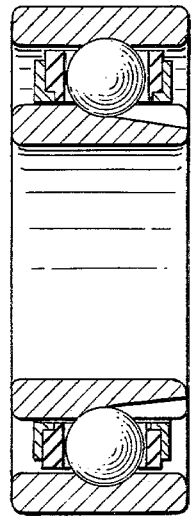
Fig. 3.
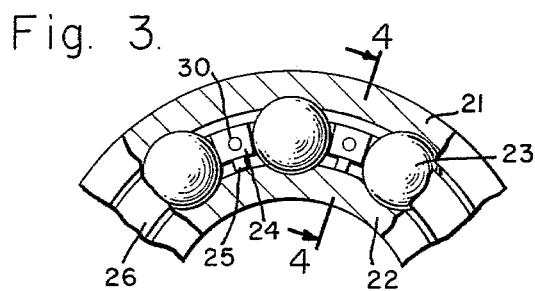
Fig. 4.
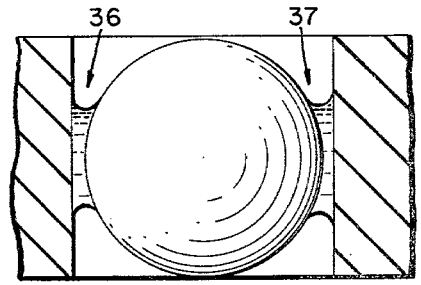
Fig. 8.
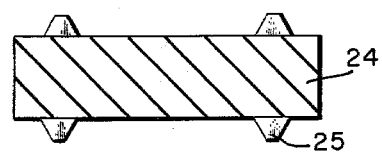
Fig. 7.
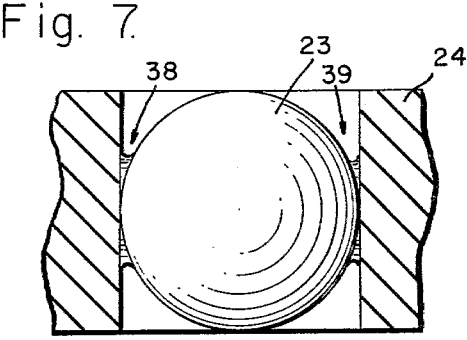
Fig. 5. (PRIOR ART)
Fig. 6. (PRIOR ART)
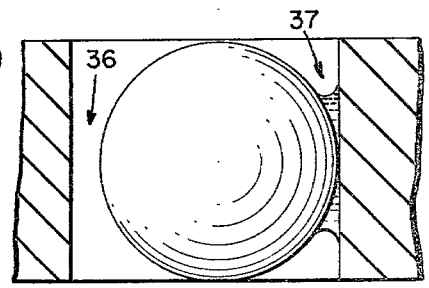

BEARING RETAINER

BACKGROUND OF THE INVENTION

This invention relates to bearing retainers, cages or separators, and more specifically, to improved lubricating ball bearing retainers employing a soft, flexible oil impregnated material.

Generally, lubricating ball bearing retainers have employed a porous, oil impregnated cotton or paper-phenolic laminated material, or the like. Such prior art bearing retainers are shown in U.S. Pat. No. 3,627,607, issued Dec. 14, 1971, for Method of Manufacturing a Bearing Cage, and U.S. Pat. No. 3,529,875, issued Sept. 22, 1970, for Reinforced Lubricating Ball Bearing Cage. These prior art ball bearing retainers exhibit a number of disadvantageous properties. The phenolic laminate material contains contaminants which cause non-wetting of the surfaces of the ball bearings in the bearing races, and non-wetting leads to loss of lubricant and high wear. The rigidity and coefficient of restitution of phenolic laminates are conducive to generating torque noise. The low porosity of only 2–10% in the phenolic laminates does not provide sufficient oil storage or safety margins for many critical applications. Also, the high wear rate of phenolic laminate due to its being a hard material leads to early failure of bearings in which it is employed.

More absorbent, sponge-like materials, such as felt, sponge rubber, or the like, have been found to be unsuitable for use in bearings. The oil transfer characteristics of oil impregnated material, such as felt, are not suitable for critical applications. Typically, during extended use, particles of the felt break off from the felt material, thus causing oil contamination and possible jamming of the bearing, resulting in bearing failure.

A retainer described in U.S. Pat. No. 4,073,552, issued Feb. 14, 1978, for Bearing Retainer and assigned to the assignee of the present invention has overcome most of the problems described above. This patent discloses using a soft, flexible, highly porous retainer material capable of absorbing between 40% and 80% by volume of a liquid lubricant, such as oil, and being capable of supplying 60% to 80% of the stored lubricant to the bearing. It also discloses that the retainer may be dimensioned so as to fit closely to the bearing balls and to the inner and outer races of the bearing. The clearance may be reduced compared to the clearance in conventional bearings by 50% to 75%. Conventional clearances between balls and pockets are usually on the order of 0.015 to 0.030 inches in a typical 6 inch diameter bearing having $\frac{3}{8}$ inch diameter balls.

Although the clearances between the balls and the pockets and the retainer and the lands have been reduced substantially as compared to conventional bearings, these members are still free to vibrate or to change position with respect to one another which leads to torque noise and instability in the bearing.

The torque noise problem relates to both high frequency and low frequency torque noise. High frequency torque noise results when the bearing members are free to vibrate relative to one another at a frequency typically in the range of 50 to 100 Hz. The low frequency torque noise problem occurs when the viscous friction of the oil film on the bearing balls and races is not constant. The constantly changing thicknesses of the oil films at the various ball/retainer and land/retainer interfaces are caused by the changing relative position of the retainer with respect to bearing lands and balls. A making and breaking action occurs at the interfaces resulting in the low frequency torque noise occuring at a typical frequency of approximately 1/10 Hz.

Accordingly, it is an object of the present invention to provide a lubricating ball bearing retainer having a long useful life in critical applications where long duration and unattended operation is required.

Another object of the invention is the provision of a ball bearing retainer having low torque noise and a minimum of instability.

A further object of the present invention is the provision of a bearing retainer having a high oil storage capacity so that the oil will not become exhausted in a short time, and which is capable of supplying most of the stored oil to the bearing.

SUMMARY OF THE INVENTION

In accordance with these and other objects of the invention, there is provided an annular body made of a soft, flexible, highly porous, oil impregnated material reinforced by rigid members which may be annular plates made of a rigid material, such as metal. The annular body is provided with ball pockets for receiving bearing balls and a plurality of projections on at least one circumferential surface. The material of which the annular body is made is an amorphous open pore, microporous foamlike material which is highly abrasion resistant, and which has a shore A hardness of between 20 and 60. The bearing balls are sized to have a slight interference fit when inserted into the ball pockets, and the plurality of projections are made so as to come into contact with one land of either an outer or inner bearing ring into which the retainer is inserted with a similar interference fit. Since all bearing members are tightly fitted together, nothing can vibrate, and thus, high frequency torque noise is eliminated. Additionally, since the retainer is tightly fitted to a bearing land and the bearing balls are tightly fitted into the ball pockets, constant oil films and oil menisci are created, and thus, low frequency torque noise is greatly reduced or eliminated. The retainer material stores a large quantity of lubricant for extended bearing life, and a large fraction of the stored lubricant is accessible to the bearing. The flexible material is inherently clean and does not cause contamination of the lubricant or bearing metal surfaces. The balls and lands contact only the flexible, oil impregnated material which produces little wear and leads to long bearing life.

BRIEF DESCRIPTION OF THE DRAWING

The foregoing and other objects and features of the present invention may be more readily understood with reference to the following detailed description taken in conjunction with the accompanying drawing, wherein like reference numerals designate like structural elements, and in which:

FIG. 1 is a sectional view of a ball bearing employing a bearing retainer in accordance with the present invention;

FIG. 2 is a sectional view of a prior art ball bearing utilizing an amorphous open pore foamlike retainer;

FIG. 3 is a cut-away axial view of a ball bearing in accordance with the present invention;

FIG. 4 is an enlarged cross-sectional view taken along the line 4—4 of a ball bearing made in accordance with the present invention;

FIGS. 5 and 6 illustrate the prior art problems in the ball/pocket interface region;

FIG. 7 illustrates the ball/pocket interface region made in accordance with the present invention;

FIG. 8 is a cross-sectional view of the bearing retainer showing the possible positions of the projections thereon; and FIG. 9 is an illustration of a pseudo-square ball pocket for use in the bearing retainer of the present invention.

DETAILED DESCRIPTION OF THE INVENTION

Referring to the drawings, FIG. 1 shows a ball bearing 20 which is of a conventional type except for the retainer thereof, as described in greater detail hereinbelow. While the ball bearing 20 here chosen to illustrate the invention is of the deep groove, single row, angular contact type, the retainer construction of the invention is not limited to such a bearing construction. The present invention may be used on radial type, double row type, thrust type and other types of bearing construction wherein the use of a retainer may be desired. In various other respects also, such as details of bearing construction, materials referred to and dimensional relationships, the following described bearings are set forth solely for illustrating the invention and are not to be taken as limiting.

The ball bearing 20 comprises an outer ring 21, and an inner ring 22 which are concentric and are radially spaced from each other. The bearing outer and inner rings 21,22 have radially aligned opposed races 31, 32, respectively, between which are disposed an annular row of bearing balls 23 which are received in the races 31, 32 in a conventional fashion.

The bearing 20 is provided with a lubricating retainer 24 having a plurality of projections 25 as an integral part of the basic foamlike structure. The basic characteristics of the foamlike retainer are described in U.S. Pat. No. 4,073,552, issued Feb. 14, 1978, for "Bearing Retainer" and issued to the assignee of the present invention. This bearing design is illustrated in FIG. 2, and a comparison of FIGS. 1 and 2 shows the basic differences in the prior art bearing and the present invention. Of particular importance are the additions of the plurality of projections 25 and the interference fits between the retainer 24 and the bearing balls 23 in the present invention. These important differences will be more fully described hereinafter.

The material of which retainer 24 is made is described in U.S. Pat. No. 4,073,552, the retainer material being a highly porous foamlike material such as "High Speed Micro-Well" sold by Elasto-Labs of Brooklyn, N.Y. The "High Speed Micro-Well" material is basically a nitrile elastomeric foam.

This material has been shown to exhibit properties well-suited for use in bearings of the type described herein. Extensive testing has been performed comparing many materials to the Micro-Well material. Included in these tests are felt, porous bronze, cotton phenolic, porous polyimide, Nylasint, sintered aluminum, porous butyl rubber, plastic foam, paper board, porous nylon, sponge, plastic and celluose fiber.

These materials have been found to exhibit characteristics less desirable for use in bearings requiring long life under severe environments than the Micro-Well foam. Thus, the present invention takes advantage of the superior properties and characteristics of the Micro-Well material as the substance used as the retainer 24.

We have described herein the use of a particular foamlike material, namely High Speed Micro-Well, but we do not want to be limited to this. Clearly other materials may be developed with similar characteristics which may be used in bearing retainer designs which would come within the scope of the present invention.

Referring now to FIG. 3, there is shown a cut-away axial view of a bearing incorporating a retainer of the present invention specifically showing the relationships between the bearing balls 23 and the plurality of projections 25.

Referring now to FIG. 4, there is shown an enlarged sectional view of the bearing of FIG. 1 incorporating the retainer of the present invention. The outer ring 21 and the inner ring 22 which may be made of metal, or the like, have a plurality of metal balls 23 disposed therebetween and in contact with the races 31 and 32 of the respective outer and inner bearing rings 21 and 22. The bearing retainer 24 has a plurality of ball pockets which accept the bearing balls 23 therein. The bearing balls 23 and the ball pockets of the retainer 24 are made so that there is an interference fit between the outer diameter of the balls 23 and the inside diameter of the ball pockets. This means that the diameter of the balls 23 is the same or slightly larger than the diameter of the ball pockets. In a typical 6-inch ball bearing having ⅜-inch balls, the amount of interference may be on the order of 0.001 inch.

Although the ball pockets of the retainer 24 are shown being in total circumferential contact with the bearing balls 23, this need not always be the case. Under certain applications a lesser amount of ball/retainer contact may be desired. The retainer pockets may be cut away providing relief areas where the bearing balls 23 are not in contact with the retainer 24. This is best illustrated in FIG. 9. A so-called pseudo-square ball pocket is formed providing ball/retainer contact at only four points around the circumference of the ball. This provides for less friction and minimizes viscous drag and reduces the size of the oil meniscus between the retainer 24 and bearing balls 23, without affecting the vibrational stability of the present invention.

The bearing retainer 24 has a plurality of projections 25 which come into contact with the bearing land 28 of the inner ring 22. In the exemplary embodiment there is a one-to-one relationship between the number of projections 25 and the number of balls 23. This is best illustrated in FIG. 3. The projections 25 are disposed between adjacent balls 23 as shown in FIG. 3. However, although a plurality of projections 25 has been disclosed, this need not always be the case. A particular bearing may only incorporate one continuous projection around the circumference of the retainer 24.

The projections 25 are sized to provide an interference fit with the land 28 of the inner ring 22. This allows no relative motion between the retainer 24 and the inner ring 22. Thus, a constant torque situation is present, the amount of torque being dependent upon the size of the projections 25, that is, the "footprint" of the projection on the land 28.

A typical projection in a 6-inch bearing has a surface area on the order of 1/16 × 1/16 inches square touching the land 28 of the inner ring 22. The size of the projection is dependent upon the size of the bearing, the available motor torque to drive the bearing and the environment in which the bearing is used. The larger the surface area of the projections 25 (or the single continuous projection), the more torque is required to drive the bearing, due to a greater amount of friction.

Structural rigidity is provided for the retainer 24 by means of reinforcing plates 26 and 27. The plates 26 and 27 may be made of metal, or the like, and are secured to the sides of the annular retainer 24, by means of rivets 30, or the like. Other types of reinforcing means may be used to secure the plates 26, 27 to the retainer 24, including cementing or bonding the parts together, or the like, or the foamlike material may be internally reinforced by using a stiffening agent which strengthens the foam but does not inhibit its lubricating or resilient qualities. This reinforcing construction is substantially identical to that of U.S. Pat. No. 4,073,552, mentioned above. Other reinforcing techniques may be readily devised by those skilled in the art, and we do not wish to be limited to the particular reinforcing methods described herein.

A better understanding of the novel aspects of the present invention will be understood by referring to FIGS. 5 through 7. FIG. 5 shows a typical prior art bearing ball and ball pocket configuration. As can be seen in FIG. 5, there is a gap between the bearing ball and the ball pocket sidewall indicated by areas 36 and 37. An oil film or meniscus builds up in the areas as indicated by the curved lines in the respective areas 36 and 37.

However, during operation, the bearing ball can shift within the pocket as illustrated in FIG. 6. Therein, the ball has shifted to the right, resulting in no oil in area 36 and an expanded meniscus of oil in area 37. This is the making and breaking action described above which directly results in low frequency torque noise. During operation of the bearing, the bearing ball in FIGS. 5 and 6 moves back and forth making and breaking oil contact in the areas 36 and 37.

Referring now to FIG. 7, there is shown a bearing ball 23 in the ball pocket of a retainer 24, in accordance with the present invention. The oil buildup in areas 38 and 39 is constant because the bearing ball 23 has no opportunity to move within the ball pocket area. This means that there is no making or breaking action and consequently no low-frequency torque noise due to this configuration.

A similar situation exists with reference to the high-frequency torque noise. In this instance, however, the retainer 24 moves in a vibratory manner with respect to the outer ring 21, the inner ring 22 and the balls 23, thus causing the high frequency torque noise mentioned above.

To keep this from happening, the projections 25 are kept in constant contact with bearing race 28 of the inner ring 22. This assures that there is no relative motion between the outer ring 21 and the inner ring 22 during bearing operation. Utilizing the projections 25 does produce a small increase of the torque characteristics of the bearing; however, this may be compensated by using a more powerful motor to drive apparatus utilizing the bearing 20 and/or by minimizing the footprint of the projections 25.

FIG. 8 is a cross-sectional view of the retainer 24 showing the projections 25, along with alternate configurations for the projections 25. This figure illustrates that the projections may contact whichever land surface of either the inner ring 22 or the outer ring 21 as may be desirable for the particular design and application of the bearing 20. The embodiment described utilizes projections 25 in contact with land 28. However, it could just as easily be in contact with land 29 of the inner ring 22. Different configurations of bearing 20 may use projections 25 contacting the outer ring 21 instead of the inner ring 22.

Tests have been performed on bearings made in accordance with the present invention comparing them with prior art bearings at various rotational speeds and varying temperatures. Tests have been performed over a period of several years on many different bearing and bearing retainer configurations. These include retainers with and without projections and incorporating loose and tight cylindrical ball pockets, loose and tight pseudo-square ball pockets and combinations of both loose and tight cylindrial and loose and tight pseudo-square ball pockets.

Results of these tests have indicated that the bearings made in accordance with the present invention have performed within acceptable torque noise limits under low temperature test conditions. However the conventional bearings having no projections or tight-fitting ball pockets have exhibited either unacceptable torque noise values or unstable performance, which means that the torque noise measurement was very high and thus unrecordable.

The test data indicates that bearings made in accordance with the present invention provide consistently reliable, low torque noise performance under low temperature environments. Although bearings made in accordance with U.S. Pat. No. 4,073,552 incorporating a foamlike retainer show marked improvement over conventional bearings as to torque noise measurements at low temperatures, bearings made in accordance with the present invention show a definite improvement over the bearings not incorporating projections and having interference fits between the bearing balls and retainer and between the projections and the bearing rings.

As a general figure of merit, bearings made in accordance with the present invention exhibit an order of magnitude improvement in measured torque noise values when compared to bearings made in accordance with U.S. Pat. No. 4,073,552. In other words, the bearings of the present invention produce less than 10 percent of the torque noise on the average than do bearings made in accordance with U.S. Pat. No. 4,073,552.

Thus there has been described an improved bearing incorporating a lubricating bearing ball retainer having low torque noise and a minimum of instability, being able to store a large quantity of liquid lubricant for extended life. The retainer is able to supply a large fraction of the stored lubricant to the bearing surfaces, thus allowing a long, useful life in critical applications where long duration and unattended operation is required.

It is to be understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:
1. A ball bearing retainer comprising:
an annular body of open pore microporous foamlike material for storing lubricant, said annular body having a plurality of openings therein for receiving bearing balls and at least one projection on at least one circumferential surface thereof for contacting at least one circumferential surface of a bearing ring, said openings being sized to have an interference fit with said bearing balls, said projection being sized to have an interference fit with said bearing ring.

2. A ball bearing retainer comprising:

an annular body of open pore microporous foamlike material for storing lubricant and rigidizing means combined with said body for maintaining the dimensional integrity thereof, said annular body having a plurality of openings therein for receiving bearing balls and at least one projection on at least one circumferential surface thereof, for contacting at least one circumferential surface of a bearing ring, said openings being sized to have an interference fit with said bearing balls, said projection being sized to have an interference fit with said bearing ring.

3. A ball bearing retainer comprising:

an annular body of open pore microporous foamlike material for storing lubricant and rigidizing means combined with said body for maintaining the dimensional integrity thereof, said annular body having a plurality of openings therein for receiving bearing balls and at least one projection on at least one circumferential surface thereof, for contacting at least one circumferential surface of a bearing ring said openings being sized to have an interference fit with said bearing balls, said projection being sized to have an interference fit with said bearing ring, said foamlike material comprising an open pore microporous nitrile elastomeric foam having a Shore A hardness of between 20 and 60.

4. A ball bearing including an inner and an outer ring with bearing balls therebetween to form load bearing metal-to-metal interfaces, and including a retainer for receiving and separating said balls, said retainer being made of a resilient, flexible foamlike material and having at least one projection on at least one circumferential surface thereof, said retainer having interference fits with said bearing balls and said projection having an interference fit with one of said rings.

5. A ball bearing including an inner and an outer ring with bearing balls therebetween to form load bearing metal-to-metal interfaces, and including a retainer for receiving and separating said balls, said retainer being made of a resilient, flexible foamlike material and having at least one projection on at least one circumferential surface thereof, said retainer having interference fits with said bearing balls and said projection having an interference fit with one of said rings, said foamlike material being capable of storing up to about 80 percent by volume of a lubricant, and from which a large fraction of lubricant stored therein is retrievable, said material having a Shore A hardness of between 20 to 60.

6. A ball bearing comprising:

a metal inner ring having at least one land;

a metal outer ring having at least one land;

metal balls therebetween to form load bearing metal-to-metal interfaces; and an annular flexible bearing ball retainer having openings for receiving and separating said balls, and having at least one projection projecting from at least one circumferential surface thereof;

said openings of said annular bearing ball retainer being sized to have an interference fit with said balls;

said projection being in contact with at least one of said lands so as to have an interference fit with the land diameter.

* * * * *